United States Patent

Tamaru et al.

[11] Patent Number: 6,117,556
[45] Date of Patent: Sep. 12, 2000

[54] TAPE FOR SEALING SCREW JOINTS

[75] Inventors: Shinji Tamaru; Katsutoshi Yamamoto, both of Osaka, Japan

[73] Assignee: Daikin Industries Ltd., Osaka, Japan

[21] Appl. No.: 08/913,090

[22] PCT Filed: Mar. 28, 1996

[86] PCT No.: PCT/JP96/00808

§ 371 Date: Sep. 9, 1997

§ 102(e) Date: Sep. 9, 1997

[87] PCT Pub. No.: WO96/30458

PCT Pub. Date: Oct. 3, 1996

[30] Foreign Application Priority Data

Mar. 31, 1995 [JP] Japan ................................ 7-075054

[51] Int. Cl.[7] .................................................. B32B 5/16
[52] U.S. Cl. ................................... 428/422; 428/910
[58] Field of Search .................... 428/421, 422, 428/910

[56] References Cited

U.S. PATENT DOCUMENTS

| | | |
|---|---|---|
| 3,002,770 | 10/1961 | Chesnut . |
| 3,315,020 | 4/1967 | Gore . |
| 3,556,161 | 1/1971 | Roberts . |
| 3,664,915 | 5/1972 | Gore . |
| 3,853,690 | 12/1974 | McGarry . |
| 3,953,566 | 4/1976 | Gore . |
| 4,096,227 | 6/1978 | Gore . |
| 4,187,390 | 2/1980 | Gore . |
| 4,194,040 | 3/1980 | Breton . |
| 4,431,698 | 2/1984 | Case . |
| 4,478,665 | 10/1984 | Hubis . |
| 4,482,516 | 11/1984 | Bowman . |
| 4,548,960 | 10/1985 | Bentley . |
| 4,596,837 | 6/1986 | Yamamoto . |
| 4,598,011 | 7/1986 | Bowman . |
| 4,720,334 | 1/1988 | DuBois . |
| 4,760,102 | 7/1988 | Moriyama . |
| 5,098,625 | 3/1992 | Huang . |
| 5,207,915 | 5/1993 | Hagen . |
| 5,804,290 | 8/1998 | Marini ................................ 428/220 |

FOREIGN PATENT DOCUMENTS

| | | |
|---|---|---|
| 48-44664 | 12/1973 | Japan . |
| 1-198675 | 8/1989 | Japan . |

*Primary Examiner*—Jenna Davis
*Attorney, Agent, or Firm*—Birch, Stewart, Kolasch & Birch, LLP

[57] ABSTRACT

An unsintered polytetrafluoroethylene tape for sealing screw joints is described. The tape is obtained by uniaxially stretching an unsintered body of a composition comprising 75 to 25 wt. parts of polytetrafluoroethylene fine powder and 25 to 75 wt. parts of inorganic powder which has new Mohs hardness of 3 or less and substantially no water absorption. The tape has excellent heat stability and sealing properties like a conventional polytetrafluoroethylene tape for screw joint sealing, but the required amount of PTFE can be decreased. Furthermore, by compounding a specific inorganic filler, the tape does not suffer from limitations regarding stretching conditions, and does not abrade or damage the screw.

13 Claims, 1 Drawing Sheet

TAPE FOR SEALING SCREW JOINTS

FIELD OF THE INVENTION

The present invention relates to an unsintered polytetrafluoroethylene (PTFE) tape for screw joint sealing. In particular, the present invention relates to an unsintered PTFE tape for screw joint sealing, which contains a specific inorganic powder.

DESCRIPTION OF THE PRIOR ART

Unsintered tapes prepared from PTFE fine powder are widely used as screw joint sealing tapes, since they have excellent sealing properties, and cleaning of sealed areas of the screw joints is easy when pipes are disassembled, cleaned and reassembled.

JP-B-48-44664 discloses a method for producing a PTFE tape. According to the disclosure of this publication, when a conventional unsintered PTFE tape is stretched in a longitudinal direction by two times or more, the tape width does not decrease substantially, and the thickness does not decrease to a measurable extent, and thus, the stretched tape having the same cross sectional area as that of the original tape is obtained. The obtained tape has a larger coefficient of friction and better self tack than the conventionally used PTFE tapes, and has improved followability to the shape of a screw. Furthermore, it is possible to provide a PTFE tape which maintains the sealing properties comparable to those of the conventional tape when it is used in a smaller amount than before.

In the above prior patent, a specific gravity of the PTFE tape is decreased by stretching, and in turn an amount of PTFE used per unit volume is decreased to reduce usage of PTFE which is one of materials which are expensive and difficult to be recovered or recycled. The reduction of the specific gravity by stretching means that voids in the tape increase. The sealing of the screw joint is achieved by filling a clearance between a male screw and a female screw with the tape. Thus, if the voids of the tape are too large due to the small specific gravity, sufficient sealing properties are not attained unless the tape thickness is increased, or the number of windings of the tape is increased, and therefore the tape lacks the utility or serviceability.

JP-A-1-198675 discloses a sheet form soft gasket. In the invention of this publication, to maintain strength of the sheet form gasket, an inorganic filler is compounded in an unsintered PTFE resin which can be fibrillated, and mixed under application of mechanical force such as shear force while fibrillating the PTFE resin powder, the compound is extruded with an extruder, and shaped in a sheet form by rolling or calendering to obtain the soft sheet gasket. But, when the PTFE resin powder is fibrillated prior to sheeting as disclosed in the above publication, it is difficult to obtain a continuous ribbon-form tape having a thickness of about 100 μm as disclosed in JP-B-48-44664. Even if the tape is rolled to such a thin thickness, both edges of the rolled film are heavily corrugated, and a yield decreases. When the specific gravity is decreased by stretching, the above film cannot be stretched even by about two times. Furthermore when the tape is used as the sealing tape, the screw may be abraded or damaged according to the kind of the inorganic filler material.

SUMMARY OF THE INVENTION

An object of the present invention is to provide a PTFE tape which has excellent heat stability and sealing properties like the conventional PTFE tape for screw joint sealing, which can decrease the required amount of PTFE by compounding a specific inorganic filler, which does not suffer from limitation on stretching conditions, and which does not abrade or damage a screw when used as a screw joint sealing tape.

According to the present invention, an unsintered polytetrafluoroethylene tape for screw joint sealing is provided, which consists of a uniaxially stretched unsintered body of a composition comprising 75 to 25 wt. parts of polytetrafluoroethylene fine powder and 25 to 75 wt. parts of inorganic powder which has new Mohs hardness (hardness of talc being 1 and that of diamond being 15) of 3 or less and substantially no water absorption.

In one preferred embodiment, the inorganic filler is at least one inorganic powder selected from the group consisting of talc, calcium carbonate and magnesium carbonate.

In another preferred embodiment, the unsintered polytetrafluoroethylene tape for screw joint sealing of the present invention is produced by uniaxially stretching the above unsintered body at a temperature lower than the melting point of sintered polytetrafluoroethylene so that a specific gravity of the stretched body is decreased to less than 1.5, and heat treating the stretched body.

DETAILED DESCRIPTION OF THE INVENTION

Figure 1:
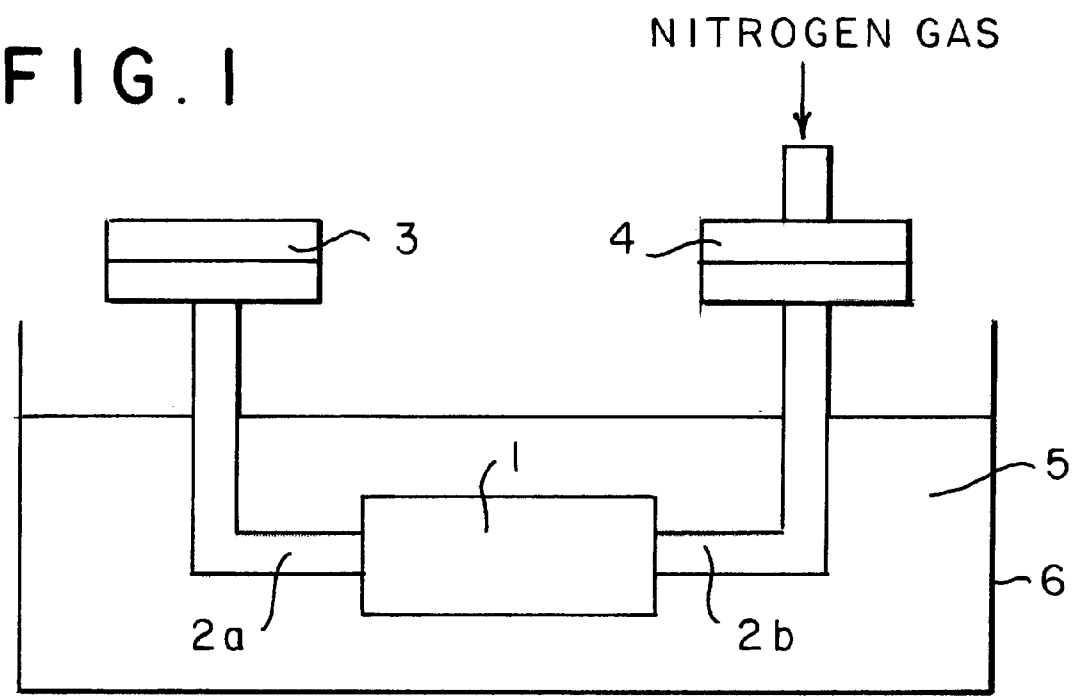
FIG. 1 schematically shows an apparatus used in heating-cooling cycle test in Experiment 1.

The inorganic powder filler used in the present invention has Mohs hardness of 3 or less, and substantially no water absorption. Other properties required for the inorganic powder filler are as follows:

(1) It has excellent heat resistance, and does not suffer from physical and chemical degradation when heated to the melting point of PTFE.

(2) It is chemically stable and resistant to general acids or alkalis.

(3) Its specific gravity is not large, and is close to that of PTFE (about 2.2).

(4) It is white, so that it does not deteriorate cleanness of the PTFE tape, and does not impair color tone when a pigment is added to PTFE.

(5) It has good slip properties, does not adhere to the screw threads, and the PTFE tape containing the filler is easily peeled off.

(6) Compounding of the inorganic filler does not interfere with the stretching of the PTFE film.

Among the inorganic powder fillers having such properties, talc, calcium carbonate and magnesium carbonate are preferred, and talc is most preferred in view of the hardness.

In the present invention a weight ratio of the PTFE fine powder to the inorganic powder (PTFE fine powder:inorganic powder) is between 75:25 and 25:75, preferably between 65:35 and 35:65, more preferably between 55:45 and 45:55.

The PTFE fine powder and inorganic powder can be mixed by any conventional mixing methods. For example, an aqueous dispersion of the PTFE fine powder and the inorganic powder are mixed to co-precipitate them. Alternatively, the precipitated PTFE fine powder and inorganic powder are mixed at a low temperature with suppressing fibrillation of PTFE. To obtain a more homogeneous mixed powder, the co-precipitation is preferred.

In the present invention, the PTFE fine powder includes a fine powder of a tetrafluoroethylene homopolymer and also a fine powder of a modified PTFE comprising at least one other comonomer in such a small amount that melt flowability is not imparted (for example, 0.001 to 2.0 wt. %, preferably 0.001 to 0.5 wt. %).

As the inorganic powder used in the present invention, a commercially available one (having an average particle size $D_{50}$ of about 1 to 10 μm) may be used. When the inorganic powder is co-precipitated with the PTFE fine powder, the inorganic powder which is made hydrophobic by surface treatment is preferably used. As the surface treating agent, a silane or titanium coupling agent, an organosiloxane, a fluorine-containing surface treating agent, and the like can be used preferably.

Herein, the term "substantially no water absorption" is intended to mean that a weight increase is less than 1%, preferably less than 0.5% when the PTFE tape containing 50 wt. % of the inorganic powder is subjected to the below described water absorbing test.

Herein, the "unsintered" body is intended to mean that the PTFE body has not been heated to the melting point of PTFE or higher.

The unsintered PTFE body is obtained by a per se conventional molding method, and its shape is usually a sheet or a film.

In general, the unsintered body is uniaxially stretched under the following conditions:

Temperature: 150 to 300° C.

Stretching rate: 5 to 1000%/se.

Stretching ratio: 1.5 to 5 times.

Usually, the sheet produced by the uniaxial stretching is heat treated to relax local strain caused by the uniaxial stretching, whereby dimensional stability of the stretched film is improved. This heat treatment is performed usually at a temperature from the stretching temperature and a temperature lower than the melting point of PTFE for 5 to 60 seconds.

The present invention will explained further in detail by the following examples.

EXAMPLE 1

Preparation of PTFE fine powder containing talc powder (1) Surface Treatment of Talc Powder Talc powder ("MICROACE" manufacture by Nippon Talc Co., Ltd.; average particle size $D_{50}$: 2.3 μm) (10 kg) and a solution of an aminosilane coupling agent ("A-1100" manufactured by Nippon Unicar Co., Ltd.) (200 g) in water (100 ml) were mixed with a Henschel mixer for 10 minutes to surface treat the talc powder. Then, the surface treated talc powder was dried in a fluidized bed with hot air at 120° C.

(2) Preparation of Mixed Powder of PTFE Fine Powder and Talc

In an emulsion polymerization liquid of PTFE fine powder F104 (manufactured by Daikin Industries Ltd.) (an aqueous dispersion of PTFE particles having an average particle size of 0.2 to 0.4 μm), the surface treated talc powder prepared in the step (1) was mixed to co-precipitate them, and the precipitated powder was dried to obtain a raw material powder. Details of the preparation conditions were as follows:

(i) In a 150 l precipitation tank, pure water (about 50 l) was charged, and the surface treated talc powder (5 kg) was dispersed while agitation with agitation blades.

(ii) Then, a 10 wt. % aqueous dispersion of the PTFE powder (50 kg corresponding to 5 kg of the resin) was charged in the tank. As the agitation was continued, the PTFE particles and talc powder were co-precipitated in the form of uniform coagulated particles, and the dispersion was separated to a liquid phase and a solid phase.

(iii) From the liquid phase, the solid phase particles were recovered, spread over a pallet to a thickness of about 3 cm and dried thoroughly in a drier at 150° C. The dried particles had the average particle size of 380 μm, and the apparent density of about 400 g/l.

Preparation of Unsintered Stretched Film (1) Mixing of a Lubricating Aid

The above prepared raw material mixed powder (5 kg) was charged in a vessel, and then a lubricating aid ("ISOPAR M", a petroleum base lubricating aid manufactured by Exxon) (1.15 kg) was added. The vessel was shaken and rotated so that the whole powder is uniformly wet with the lubricating aid, followed by aging at 25° C. for 24 hours.

(2) Paste Extrusion Molding

The raw material powder prepared in the step (1) for mixing the aid was pressed in a cylinder having a diameter of 89 mm under pressure of 10 kg/cm$^2$ for 10 minutes to obtain a premolded article.

The premolded article was extruded through a paste extruding mold to produce a PTFE sheet containing the lubricating aid and having a thickness of 3 mm and a width of 200 mm.

(3) Calendering and Drying of the Lubricating Aid

The PTFE sheet produced in the paste extrusion molding step (2) was calendered using a pair of calendering rolls each having a diameter of 500 mm and a length of 700 mm which were heated at 70° C. and rotated at a peripheral speed of 20 m/min. to obtain a rolled film having a thickness of 120 μm and a width of 210 mm.

Then, the lubricating aid was evaporated off from the rolled film on a roll having a diameter of 300 mm and a length of 500 mm which was heated at 200° C. and rotated at a peripheral speed of 5 m/min.

(4) Production of Unsintered Stretched PTFE Film

The rolled film produced in the step (3) was stretched between a roll having a diameter of 300 mm and a length of 500 mm which was heated at 300° C. and rotated at a peripheral speed of 2 m/min. and a roll having a diameter of 250 mm and a length of 500 mm which was heated at 300° C. and rotated at a peripheral speed of 5 m/min. The distance between the tangential lines to the respective rolls was about 10 cm.

Subsequently, the stretched film was subjected to the heat treatment (heat set) using a roll having a diameter of 300 mm and a length of 500 mm which was heated at 300° C. and rotated at a peripheral speed of 5 m/min.

The talc powder-containing PTFE film produced in the previous step was cut to a width of 12.5 mm along the longitudinal direction to obtain a ribbon-form film, and its physical properties were measured. The results are as follows:

Tape thickness: 120 µm

Specific gravity: 0.7

Strength at break: 2.2 kg (at a pulling rate of 200 mm/min.)

Elongation at break: 30%

Spontaneous shrinkage factor: 1–3%

Experiment 1

Heating-cooling Cycle Test

As shown in FIG. 1, inner surfaces of both ends of a 20 A socket 1 for gas piping according to JIS and an outer surface of each of pipes 2a and 2b were threaded at PT (tapered screw) ¾ (not shown). Then, the ribbon-form PTFE film produced in Example 1 was spirally wound around each of the threaded parts of the pipes 2a and 2b with overlapping one quarter of the tape width (not shown), and the threaded parts of the pipes were screwed in the respective ends of the socket 1.

Furthermore, the other end of the pipe 2a was sealed at a flange 3, while the other end of the pipe 2b was connected to a nitrogen gas inlet tube with a flange 4 to assemble an apparatus for a heating-cooling cycle test.

This apparatus was immersed in a heating medium 5 contained in a tank 6, and an experiment was performed to check leakage at the sealing. That is, the socket 1 including the parts screwed with the pipes 2a and 2b was alternately immersed in cold water at 20 to 25° C. and warm water at 70 to 80° C. for 30 minutes each, during which the pressure in the pipes was maintained at 10 kg/cm$^2$ with the nitrogen gas. These procedures were repeated 30 days, no gas leakage from the sealed area was observed.

After finishing the above test, the talc powder-containing PTFE sealing tape was removed. The tape was easily removed without adhesion to the screws unlike the PTFE sealing tape containing no filler, and the sealing tape could be rewound around the screw without any problem.

Experiment 2

Damage of the Screw Threads

Figure 2:
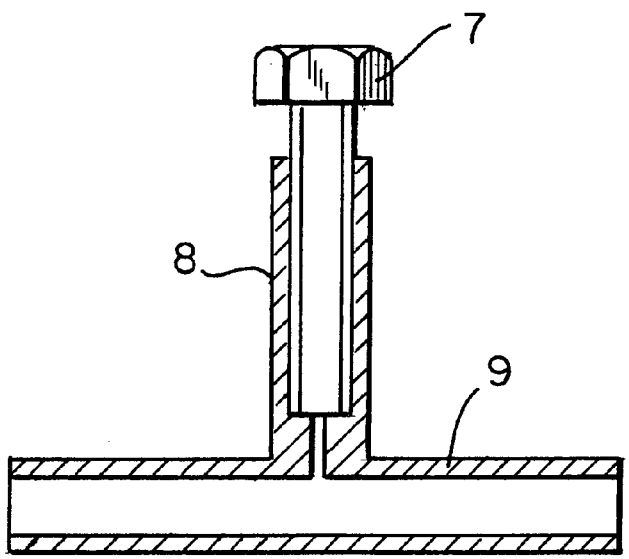
FIG. 2 is a cross sectional view of an apparatus used for checking damage/abrasion of a screw thread in Experiment 2.

As shown in FIG. 2, using an aluminum material (kind: 1070) corresponding to JIS H4000, a bolt 7 having a male screw corresponding to a parallel screw PF ½ according to JIS B0202 (leg length of 40 mm), and a box nut 8 (depth of 30 mm) having a female screw which was connected to a pressure pipe 9 were produced.

Then, the ribbon-form PTFE film produced in Example 1 was spirally wound around the threaded part of the bolt 7 with overlapping one quarter of the tape width (not shown). This bolt 7 which was wrapped by the sealing tape was screwed in the box nut until its tip end reached the deepest part of the box nut, and a pressuring pipe 9 was pressurized with nitrogen gas to 5 kg/cm$^2$.

After confirming that no leakage occurred, the pressure was released, the bolt was unscrewed, and the used sealing tape was completely removed. These procedures were repeated 100 times, and then the damaged state of the screw threads was observed, but no flaw or damage was found.

Experiment 3

By taking the use applications of the sealing tape into account, its water absorbance and acid resistance were measured as follows:

Water Absorbing Test

In a 3 wt. % aqueous solution of a surfactant ($C_7F_{14}COONH_4$), the tape (100 g) was immersed for 48 hours, and pulled out. Then, the tape was dried in a vacuum drier at 90° C. for 12 hours, and weighed with an automated balance which weighs a weight at an accuracy of 0.1 g order.

A weight change was expressed in terms of a percentage in relation to a weight of the tape before immersion in the above aqueous solution.

Acid Resistance Test

In a 10% hydrochloric acid containing 3 wt. % of a surfactant ($C_7H_{14}COOH$) (2 liters in total), the tape (100 g) was immersed for 48 hours and pulled out. Then, the tape was dried in a vacuum drier at 90° C. for 12 hours, and weighed with an automated balance which weighs a weight at an accuracy of 0.1 g order.

A weight change was expressed in terms of a percentage in relation to a weight of the tape before immersion in the above acid solution.

EXAMPLES 2–3 AND COMPARATIVE EXAMPLE 1

A ribbon-form PTFE tape containing an inorganic filler was produced in the same manner as in Example 1 except that calcium carbonate (Example 2), magnesium carbonate (Example 3), or gypsum (Comparative Example 1) was used in place of talc.

The results are shown in the Table.

The details of the used inorganic fillers are as follows:

Calcium carbonate: SUNLITE #1000 manufactured by TAKEHARA Chemical Industries, Ltd.

Magnesium carbonate: KINSEI manufactured by KOHJIMA Chemical Industries, Ltd.

Gypsum: Anhydrous $CaSO_4$ which is prepared by a reaction between $CaF_2$ and $H_2SO_4$ was changed to its dihydrate form, and pulverized with a hammer and sieved to obtain particles having an average particle size of 5 µm (maximum 10 µm to minimum 0.05 µm.

COMPARATIVE EXAMPLE 2

A ribbon-form sealing tape was produced in the same manner as in Example 1 except that a mixed powder of PTFE fine powder and glass fiber (POLYFLON FPG 1050 manufactured by Daikin Industries Ltd.) was used as a raw material for the production of an unsintered stretched film.

The obtained tape was subjected to the same experiments as above. In Experiment 2, no gas leakage was observed, but gray deposits adhered to the surface of the used sealing tape. The deposits were elementary analyzed, and it was found that they consisted of aluminum.

From this result, it is apparent that the PTFE sealing tape containing the glass fiber abraded the screw part.

TABLE

|  | Example No. | | | Comp. Example No. | |
| --- | --- | --- | --- | --- | --- |
|  | 1 | 2 | 3 | 1 | 2 |
| Filler | Talc | Calcium carbonate | Magnesium carbonate | Gypsum | Glass fiber |
| Mohs hardness | 1 | 2 | 3 | 2 | 6–7 |
| Wt. % | 50 | 50 | 50 | 50 | 25 |
| Average particle size of filler (μm) | 380 | 400 | 390 | 420 | 500 |
| Apparent density of filler (g/l) | 400 | 410 | 410 | 420 | 450 |
| Tape thickness (μm) | 120 | 120 | 120 | 120 | 120 |
| Specific gravity of tape | 0.7 | 0.7 | 0.65 | 0.65 | 0.7 |
| Tape strength (kg) | 2.2 | 2.1 | 2.0 | 2.0 | 1.8 |
| Tape elongation (%) | 30 | 35 | 35 | 30 | 25 |
| Spontaneous shrinkage factor of tape (%) | 1–3 | 1–3 | 1–3 | 1–3 | 1–2 |
| Heating-cooling cycle test | No leakage | No leakage | No leakage | No leakage | No leakage |
| Damage of screw thread | None | None | None | None | Yes |
| Water absorbance weight increase (%) | 0 | 0 | 0 | 0 | 0 |
| Acid resistance weight increase (%) | 0 | –3 | –5 | 2 | 0 |

Effects of the Invention

The PTFE sealing tape containing the organic powder according to the present invention is an economical screw joint sealing tape which has excellent heat stability and sealing properties like the conventional PTFE sealing tape, is easily stretched, and does not abrade or damage a screw.

What is claimed is:

1. An unsintered polytetrafluoroethylene tape for sealing screw joints consisting of a uniaxially stretched unsintered body of a composition comprising 75 to 25 wt. parts of polytetrafluoroethylene fine powder and 25 to 75 wt. parts of an inorganic powder of talc.

2. The polytetrafluoroethylene tape according to claim 1, which is produced by uniaxially stretching said unsintered body at a temperature lower than a melting point of sintered polytetrafluoroethylene so that a specific gravity of said stretched body is decreased to less than 1.5, and heat treating said stretched body.

3. The polytetrafluoroethylene tape according to claim 1, wherein the talc inorganic powder has a new Mohs hardness of 3 or less and substantially no water absorption.

4. The polytetrafluoroethylene tape according to claim 1, wherein the polytetrafluoroethylene fine powder is present in an amount of 65 to 35 wt. parts and the talc inorganic powder is present in an amount of 35 to 65 wt. parts.

5. The polytetrafluoroethylene tape according to claim 1, wherein the polytetrafluoroethylene fine powder is present in an amount of 55 to 45 wt. parts and the talc inorganic powder is present in an amount of 45 to 55 wt. parts.

6. The polytetrafluoroethylene tape according to claim 1, wherein the talc inorganic powder has an average particle size $D_{50}$ of about 1 to 10 microns.

7. The polytetrafluoroethylene tape according to claim 3, wherein the talc inorganic powder has an average particle size $D_{50}$ of about 1 to 10 microns.

8. An unsintered polytetrafluoroethylene tape for sealing screw joints comprising a uniaxially stretched unsintered body of a composition comprising 75 to 25 wt. parts of polytetrafluoroethylene fine powder and 25 to 75 wt. parts of an inorganic powder of talc.

9. The polytetrafluoroethylene tape according to claim 8, wherein the talc inorganic powder has a new Mohs hardness of 3 or less and substantially no water absorption.

10. The polytetrafluoroethylene tape according to claim 8, wherein the polytetrafluoroethylene fine powder is present in an amount of 65 to 35 wt. parts and the talc inorganic powder is present in an amount of 35 to 65 wt. parts.

11. The polytetrafluoroethylene tape according to claim 8, wherein the polytetrafluoroethylene fine powder is present in an amount of 55 to 45 wt. parts and the talc inorganic powder is present in an amount of 45 to 55 wt. parts.

12. The polytetrafluoroethylene tape according to claim 8, wherein the talc inorganic powder has an average particle size $D_{50}$ of about 1 to 10 microns.

13. The polytetrafluoroethylene tape according to claim 9, wherein the talc inorganic powder has an average particle size $D_{50}$ of about 1 to 10 microns.

* * * * *